(12) United States Patent
Keith (10) Patent No.: US 8,380,609 B2
(45) Date of Patent: Feb. 19, 2013

(54) TRADING SYSTEM WITH ELFS AND UMPIRES

(75) Inventor: Christopher Keith, New York, NY (US)

(73) Assignee: Stikine Technology, LLC, Las Vegas, NV (US)

( * ) Notice: Subject to any disclaimer, the term of this patent is extended or adjusted under 35 U.S.C. 154(b) by 413 days.

(21) Appl. No.: 11/469,378

(22) Filed: Aug. 31, 2006

(65) Prior Publication Data

US 2007/0255642 A1    Nov. 1, 2007

Related U.S. Application Data

(63) Continuation of application No. 09/546,031, filed on Apr. 10, 2000.

(51) Int. Cl.
*G06Q 40/00* (2012.01)
(52) U.S. Cl. .......................................................... 705/37
(58) Field of Classification Search .............. 705/35–38, 705/35 R, 36 R, 38 R
See application file for complete search history.

(56) References Cited

U.S. PATENT DOCUMENTS

| | | |
|---|---|---|
| 3,702,007 A | 10/1972 | Davis, II |
| 4,346,442 A | 8/1982 | Musmanno |
| 4,376,978 A | 3/1983 | Musmanno |
| 4,456,957 A | 6/1984 | Schieltz |
| 4,674,044 A | 6/1987 | Kalmus |
| 4,823,265 A | 4/1989 | Nelson |
| 4,920,485 A | 4/1990 | Vahidsafa |
| 5,077,665 A | 12/1991 | Silverman |
| 5,101,353 A | 3/1992 | Lupien |
| 5,148,365 A | 9/1992 | Dembo |
| 5,253,165 A | 10/1993 | Leiseca |
| 5,297,031 A | 3/1994 | Gutterman |
| 5,297,032 A | 3/1994 | Trojan |

(Continued)

FOREIGN PATENT DOCUMENTS

| | | |
|---|---|---|
| WO | 0063814 A1 | 10/2000 |
| WO | 0102930 A2 | 1/2001 |

OTHER PUBLICATIONS

SEC Tells Markets to Start Transition to Decimal Pricing; Securities: Stocks, options can be quoted in increments of 5 cents. Change from fractions must be complete by year-end.; [Home Edition], Los Angeles Times. Los Angeles, Calif.: Jan. 29, 2000. p. C.1.*

(Continued)

*Primary Examiner* — Hani M Kazimi
*Assistant Examiner* — Clement B Graham
(74) *Attorney, Agent, or Firm* — Christensen O'Connor Johnson Kindness PLLC (57) ABSTRACT

Price setting for a security occurs by automatically engaging in a price discovery procedure before responding to a request for a current buy or sell price of the security to provide an automatically discovered price that is better than a book price. The book price is the best price in an order book including orders to buy or sell specified quantities of the security at respective prices, the lowest sell order price of the booked orders being the book sell price, the highest buy order price of the booked orders being the book buy order price. The price discovery procedure includes providing the book buy or sell price to at least one entity registered to participate in the price discovery procedure. The entity automatically provides an improved price relative to the book price based on a predetermined strategy that is determined independently of the strategies for other entities. The temporal duration of the price discovery procedure can be predetermined or based on an amount of activity occurring during the price discovery procedure.

20 Claims, 5 Drawing Sheets

U.S. PATENT DOCUMENTS

| | | | |
|---|---|---|---|
| 5,305,200 | A | 4/1994 | Hartheimer |
| 5,315,634 | A | 5/1994 | Tanaka |
| 5,404,551 | A | 4/1995 | Katsuno |
| 5,412,804 | A | 5/1995 | Krishna |
| 5,453,601 | A | 9/1995 | Rosen |
| 5,535,393 | A | 7/1996 | Reeve |
| 5,615,269 | A | 3/1997 | Micali |
| 5,689,652 | A | 11/1997 | Lupien |
| 5,787,402 | A | 7/1998 | Potter |
| 5,806,048 | A | 9/1998 | Kiron |
| 5,826,244 | A | 10/1998 | Huberman |
| 5,845,266 | A | 12/1998 | Lupien |
| 5,847,845 | A | 12/1998 | Takahashi |
| 5,864,827 | A | 1/1999 | Wilson |
| 5,915,245 | A | 6/1999 | Patterson, Jr. |
| 5,924,082 | A | 7/1999 | Silverman |
| 5,924,083 | A | 7/1999 | Silverman |
| 5,941,996 | A | 8/1999 | Smith |
| 5,946,666 | A | 8/1999 | Nevo |
| 5,946,667 | A | 8/1999 | Tull, Jr. |
| 5,950,176 | A | 9/1999 | Keiser |
| 5,950,177 | A | 9/1999 | Lupien |
| 5,953,707 | A | 9/1999 | Huang |
| 5,963,923 | A | 10/1999 | Garber |
| 5,978,779 | A | 11/1999 | Stein |
| 5,983,200 | A | 11/1999 | Slotznick |
| 5,987,435 | A | 11/1999 | Weiss |
| 6,012,043 | A | 1/2000 | Albright |
| 6,012,046 | A | 1/2000 | Lupien |
| 6,014,643 | A | 1/2000 | Minton |
| 6,016,483 | A | 1/2000 | Rickard |
| 6,018,722 | A * | 1/2000 | Ray et al. ............... 705/36 R |
| 6,021,397 | A * | 2/2000 | Jones et al. ............ 705/36 R |
| 6,021,398 | A | 2/2000 | Ausubel |
| 6,026,383 | A | 2/2000 | Ausubel |
| 6,029,146 | A | 2/2000 | Hawkins |
| 6,035,287 | A | 3/2000 | Stallaert |
| 6,035,289 | A | 3/2000 | Chou |
| 6,068,117 | A | 5/2000 | Koehn |
| 6,092,056 | A | 7/2000 | Tull, Jr. |
| 6,101,484 | A | 8/2000 | Halbert |
| 6,105,005 | A | 8/2000 | Fuhrer |
| 6,131,087 | A | 10/2000 | Luke |
| 6,134,535 | A | 10/2000 | Belzberg |
| 6,160,204 | A | 12/2000 | Steffens |
| 6,236,980 | B1 | 5/2001 | Reese |
| 6,260,025 | B1 | 7/2001 | Silverman |
| 6,278,982 | B1 | 8/2001 | Korhammer |
| 6,285,989 | B1 | 9/2001 | Shoham |
| 6,317,727 | B1 | 11/2001 | May |
| 6,317,728 | B1 | 11/2001 | Kane |
| 6,321,212 | B1 | 11/2001 | Lange |
| 6,343,278 | B1 | 1/2002 | Jain |
| 6,359,633 | B1 | 3/2002 | Balasubramaniam |
| 6,377,940 | B2 | 4/2002 | Tilfors |
| 6,381,692 | B1 | 4/2002 | Martin |
| 6,405,180 | B2 | 6/2002 | Tilfors |
| 6,408,282 | B1 | 6/2002 | Buist |
| 6,418,419 | B1 | 7/2002 | Nieboer |
| 6,421,653 | B1 | 7/2002 | May |
| 6,493,681 | B1 | 12/2002 | Tertitski |
| 6,493,682 | B1 | 12/2002 | Horrigan |
| 6,505,174 | B1 * | 1/2003 | Keiser et al. ............... 705/36 R |
| 6,553,346 | B1 | 4/2003 | Walker |
| 6,594,643 | B1 | 7/2003 | Freeny, Jr. |
| 6,601,044 | B1 | 7/2003 | Wallman |
| 6,625,583 | B1 | 9/2003 | Silverman |
| 6,629,082 | B1 | 9/2003 | Hambrecht |
| 6,766,372 | B1 | 7/2004 | Stern |
| 6,792,399 | B1 | 9/2004 | Phillips |
| 6,850,907 | B2 | 2/2005 | Lutnick |
| 6,944,879 | B2 | 9/2005 | Hirayama |
| 6,968,318 | B1 * | 11/2005 | Ferstenberg et al. ............ 705/37 |
| 7,024,387 | B1 | 4/2006 | Nieboer |
| 7,035,819 | B1 | 4/2006 | Gianakouros |
| 7,058,601 | B1 | 6/2006 | Paiz |
| 7,162,447 | B1 | 1/2007 | Cushing |
| 7,242,669 | B2 | 7/2007 | Bundy et al. |
| 7,383,220 | B1 * | 6/2008 | Keith ............... 705/37 |
| 7,454,372 | B1 | 11/2008 | Anaya |
| 7,617,144 | B2 | 11/2009 | Madoff |
| 2001/0042785 | A1 * | 11/2001 | Walker et al. ............ 235/379 |
| 2002/0004774 | A1 | 1/2002 | Defarlo |
| 2002/0023037 | A1 | 2/2002 | White, Jr. |
| 2002/0103732 | A1 | 8/2002 | Bundy |
| 2002/0107781 | A1 | 8/2002 | Neyman |
| 2002/0138390 | A1 | 9/2002 | May |
| 2002/0156719 | A1 | 10/2002 | Finebaum |
| 2002/0161687 | A1 | 10/2002 | Serkin |
| 2003/0014354 | A1 | 1/2003 | Madoff |
| 2003/0014379 | A1 | 1/2003 | Saias |
| 2003/0093343 | A1 | 5/2003 | Huttenlocher |
| 2004/0117302 | A1 * | 6/2004 | Weichert et al. ............ 705/40 |
| 2006/0106713 | A1 | 5/2006 | Tilly |
| 2006/0195386 | A1 | 8/2006 | Glodjo |
| 2006/0218071 | A1 | 9/2006 | Sweeting |
| 2007/0250433 | A1 | 10/2007 | Bhat |
| 2008/0077538 | A1 | 3/2008 | Schebece |
| 2008/0097893 | A1 | 4/2008 | Walsky |
| 2008/0177652 | A1 | 7/2008 | Weiss |
| 2009/0030828 | A1 | 1/2009 | Haller |
| 2009/0083175 | A1 | 3/2009 | Cushing |
| 2009/0171832 | A1 | 7/2009 | Busby |
| 2010/0088212 | A1 | 4/2010 | Czupek |

OTHER PUBLICATIONS

Twitchell, E.E., "Barron's Online: Extreme Markets," Barron's 80(15):36, Apr. 20, 2000.

Lowenstein, R., "Why Stock Options Can Be Dynamite for a Portfolio," Wall Street Journal (Europe), Nov. 7, 1997, p. 13.

McGuire, C., "FIXML Set for Launch," Wall Street & Technology 17(3):50, Mar. 1999.

Tsu, M.E., "Tutorial on Using Options in Active Strategies," Derivatives Quarterly 6(1):39-48, Fall 1999.

U.S. Securities and Exchange Commission, "Special Study: Payment for Order Flow and Internalization in the Options Markets," Office of Compliance Inspections and Examinations/Office of Economic Analysis, Dec. 2000, <http://www.sec.gov/news/studies/ordpay.htm> [retrieved Mar. 25, 2008], pp. 1 and 12-14.

Olsen, R.A., "Behavioral Finance and Its Implications for Stock-Price Volatility," Financial Analysts Journal 54(2), Mar./Apr. 1998, <http://proquest.umi.com/pqdweb?index=3&did=28950600&SrchMode=1&sid=2&Fmt=4&V . . . > [retrieved Mar. 28, 2008], 14 pages.

Handa, P., et al., "A Tale of Two Trading Venues: Electronically Delivered Orders vs. Floor Brokered Orders on the American Stock Exchange," Proceedings of the 32nd Hawaii International Conference on Systems Sciences [HICSS-32], Jan. 1999, 7 pages.

Karande, K., "MiFI D Best Execution Benchmark," a discussion based on "The Process of Achieving Best Execution, Investment Guides: Transaction Performance, the Changing Face of Trading," Euromoney, Institutional Investor PLC, Mar. 2002, pp. 1-15.

PR Newswire, "TIS Worldwide Builds Stock Market Game for Securities Industry Foundation for Economic Education," New York, Apr. 3, 2000, <http://proquest.umi.com/pqdweb?index=0&did=57225218&SrchMode=1&sid=2&Fmt=3&V . . . > [retrieved Jun. 22, 2008], 3 pages.

Paradigm Receives Order from RACO Industries; Purchase Order Follows Successful Product Trial, Business Editors, Business Wire, New York, Mar. 8, 2001, <http://proquest.umi.com/pqdweb?index=0&did=69346571&SrchMode=1&sid=2&Fmt=3&VI . . . > [retrieved Sep. 2, 2008], pp. 1-4.

Final Office Action mailed Jun. 11, 2010, in U.S. Appl. No. 09/546,031, filed Apr. 10, 2000.

Notice of Allowance mailed Jan. 28, 2010, in U.S. Appl. No. 11/515,362, filed Aug. 31, 2006.

Office Action mailed Apr. 15, 2010, in U.S. Appl. No. 11/469,385, filed Aug. 31, 2006.

Buckley, C., Industrial Editor, "Eastern Poised to Sell Power Stations" (4M edition), The Times (London), Apr. 10, 2000, p. 22.

Chanjaroen, C., "Thai Exchange to Alter Timing of Index Close," The Asian Wall Street Journal, Jun. 25, 1999, <http://proquest.umi.com.pqdweb?index=2&did=42650676&SrchMode=1&sid=1&Fmt=3&V . . . > [retrieved Oct. 1, 2008], 2 pages.

Office Action mailed Aug. 25, 2004, in U.S. Appl. No. 09/802,169, filed Mar. 8, 2001.

Final Office Action mailed Feb. 24, 2005, in U.S. Appl. No. 09/802,169, filed Mar. 8, 2001.

Office Action mailed Jan. 27, 2006, in U.S. Appl. No. 09/802,169, filed Mar. 8, 2001.

Final Office Action mailed Nov. 2, 2006, in U.S. Appl. No. 09/802,169, filed Mar. 8, 2001.

Office Action mailed Jun. 20, 2007, in U.S. Appl. No. 09/802,169, filed Mar. 8, 2001.

Notice of Allowance mailed Feb. 5, 2008, in U.S. Appl. No. 09/802,169, filed Mar. 8, 2001.

Office Action mailed Mar. 4, 2003, in U.S. Appl. No. 09/546,031, filed Apr. 10, 2000.

Final Office Action mailed Oct. 20, 2005, in U.S. Appl. No. 09/546,031, filed Apr. 10, 2000.

Office Action mailed May 23, 2006, in U.S. Appl. No. 09/546,031, filed Apr. 10, 2000.

Office Action mailed Jan. 16, 2007, in U.S. Appl. No. 09/546,031, filed Apr. 10, 2000.

Notice of Allowance mailed Oct. 1, 2007, in U.S. Appl. No. 09/546,031, filed Apr. 10, 2000.

Notice of Allowance mailed Jun. 9, 2008, in U.S. Appl. No. 09/546,031, filed Apr. 10, 2000.

Office Action mailed Oct. 8, 2008, in U.S. Appl. No. 09/546,031, filed Apr. 10, 2000.

Office Action mailed May 27, 2009, in U.S. Appl. No. 09/546,031, filed Apr. 10, 2000.

Office Action mailed Feb. 23, 2009, in U.S. Appl. No. 11/469,385, filed Aug. 31, 2006.

Office Action mailed May 1, 2007, in U.S. Appl. No. 11/515,362, filed Aug. 31, 2006.

Final Office Action mailed Nov. 14, 2007, in U.S. Appl. No. 11/515,362, filed Aug. 31, 2006.

Office Action mailed Jul. 17, 2008, in U.S. Appl. No. 11/515,362, filed Aug. 31, 2006.

Final Office Action mailed Apr. 10, 2009, in U.S. Appl. No. 11/515,362, filed Aug. 31, 2006.

Office Action mailed Nov. 18, 2010, in U.S. Appl. No. 09/546,031, filed Apr. 10, 2000.

Office Action mailed Dec. 13, 2010, in U.S. Appl. No. 11/469,385, filed Aug. 31, 2006.

"BEA Endorses RosettaNet Open Standards for E-Market Integration," PR Newswire, New York, Apr. 10, 2000, <http://proquest.umi.com/pqdweb?index=1&did=52510762&SrchMode=1&sid=3&Fmt=3&V . . . > [retrieved Aug. 28, 2010], 3 pages.

"Big Board System Slowed AOL Investors Monday," The Wall Street Journal (Eastern Edition), New York, New York, Apr. 21, 1999, <http://proquest.umi.com/pqdweb?index=0&did=40709814&SrchMode=1&sid=3&Fmt=3& . . . > [retreived Oct. 25, 2009], 1 page.

Notice of Allowance mailed May 9, 2012, in U.S. Appl. No. 09/546,031, filed Apr. 10, 2000, 39 pages.

Final Office Action mailed Jul. 21, 2011, in U.S. Appl. No. 11/469,385, filed Aug. 31, 2006.

Office Action mailed Apr. 27, 2012, in U.S. Appl. No. 11/469,385, filed Aug. 31, 2006, 13 pages.

Arvedlund, E., "An Arranged Exchange," Business2.com, Feb. 6, 2001, pp. 90-91.

Board of Trade of the City of Chicago, Commodity Trading Manual, 1998, pp. 178-179, 387.

Chang, K., "New Age Bidding: Against Computers, Humans Usually Lose," [online] The New York Times, Jan. 2, 2001, <http://www.nytimes.com/2001/01/02/science/02BIDS.html?printpage=yes>.

Dalton, J.M., How the Stock Market Works, 3d ed., Prentice Hall, Englewood Cliffs, N. J., Chaps. 5 and 7, 2001.

Hull, J.C., Introduction to Futures & Options Markets, 2d ed., Prentice Hall, Englewood Cliffs, N. J., 1995, pp. 4-6, 11, 26, 33-34.

Keyes, J. (ed.), "Handbook of Technology Financial Services," Auerbach Publications, New York, Chaps. 5, 36, 37, and 40, 1999.

"LAB RAT: Smart Technology Trounces Traders" [e-mail from lab_rat@listserv.redherring.com], Feb. 8, 2001, <http://www.redherring.com/insider/2001/0208/tech-labrat020801.html>, pp. 1-5.

Livingston, M., Bonds and Bond Derivatives, Blackwell Publishers Inc., Malden, Mass., 1999, pp. 38-41.

Maes, P., et al., "Agents That Buy and Sell: Transforming Commerce as We Know It," Communications of the ACM 42(3):1-12, Mar. 1999.

Michigan Internet AuctionBot, Jun. 20, 1997, <http://auction.eecs.umich.edu/features.html> [retrieved Mar. 30, 2000], 9 pages.

"More Companies Buying Back Stock," The Salt Lake Tribune, Apr. 9, 2000, <http://proquest.umi.com/pqdweb?index=6&did=52501230&SrchMode=1&sid=21&Fmt=3 . . . > [retrieved Nov. 3, 2005].

Ogata, H., et al., "Distributed PeCo-Mediator: Finding Partners via Personal Connections," Proceedings of the IEEE International Conference on Systems, Man and Cybernetics, Beijing, China, Oct. 14-17, 1996, pp. 802-807.

The Options Institute, "Options: Essential Concepts & Trading Concepts," 3rd ed., McGraw-Hill, New York, 1999, p. 420.

Propson, D., "The Secret Matchmaker," Business2.com,, Mar. 6, 2001, pp. 90 91.

Rijnen, H., "Trading Places," Alleycat News, Nov. 2000, pp. 61-73.

Rosen, J., and K.M. Merz (eds.), The Handbook of Investment Technology: A State-of the-Art Guide to Selection, Implementation & Utilization, McGraw-Hill, New York, Chaps. 7, 8, and 15, 1996.

"Streamer Free Real-Time Stock Quote Service Registers 12,000 Users," PR Newswire, Nov. 3, 1999, <http://www.findarticles.com/m4PRN/1999_Nov_3/57153236/p1/article.jhtml> [retrieved Apr. 5, 2004].

Teweles, R.J., et al., The Stock Market, Wiley, New York, Chaps. 8 and 23, 1998.

Wellman, M.P., and P.R. Wurman, "Real Time Issues for Internet Auctions," First IEEE Workshop on Dependable and Real-Time E-Commerce Systems, Denver, Colo., Jun. 1998, 6 pages.

Wurman, P.R., et al., "Flexible Double Auctions for Electronic Commerce: Theory and Implementation," Decision Support Systems 24(1):17-27, 1998.

* cited by examiner

TRADING SYSTEM WITH ELFS AND UMPIRES

CROSS-REFERENCE TO RELATED APPLICATIONS

This application is a continuation of U.S. patent application Ser. No. 09/546,031, filed Apr. 10, 2000, and is further related to U.S. patent application Ser. No. 09/801,490, now U.S. Pat. No. 7,774,246; Ser. Nos. 09/801,495; 09/801,583, now U.S. Pat. No. 7,496,533; Ser. No. 09/801,588, now U.S. Pat. No. 7,644,027; Ser. No. 09/801,848, now U.S. Pat. No. 7,882,007; Ser. No. 09/802,005, now U.S. Pat. No. 7,813,991; Ser. No. 09/802,025, now U.S. Pat. No. 7,472,087; Ser. No. 09/802,088, now U.S. Pat. No. 7,383,220; Ser. Nos. 09/802,160; 09/802,161, now U.S. Pat. No. 7,539,638; Ser. Nos. 09/802,163; 09/802,169, now U.S. Pat. No. 7,398,244; Ser. No. 09/802,223, now U.S. Pat. No. 7,908,198; Ser. No. 09/802,237, now U.S. Pat. No. 7,890,410; Ser. No. 09/803,615, now U.S. Pat. No. 7,792,733; Ser. Nos. 11/469,385; 11/515,356; 11/515,230, now U.S. Pat. No. 7,835,975; Ser. No. 11/515,231, now U.S. Pat. No. 7,783,561; Ser. No. 11/515,502, now U.S. Pat. No. 7,890,415; Ser. No. 11/469,466, now U.S. Pat. No. 7,769,672; Ser. No. 11/469,470, now U.S. Pat. No. 7,383,222; Ser. No. 11/514,714, now U.S. Pat. No. 7,574,398; and Ser. No. 11/515,362, now U.S. Pat. No. 7,739,174, all of which are owned by the assignee of the present application.

BACKGROUND OF THE INVENTION

The present invention relates to securities trading systems, and more particularly, is directed to a system for facilitating price improvement from a crowd of programs respectively representing orders.

Shares representing corporate securities and other fungible financial instruments are typically bought and sold between parties via a trading process in which the owner (seller) informs his or her broker that the owner is interested in selling shares, and the would-be owner (buyer) informs his or her broker that the would-be owner is interested in buying shares.

In the simplest cases, the owner tells the broker to sell a specified number of shares immediately at whatever price can be obtained; this is referred to as a "market" order. In a more sophisticated case, the owner tells the broker to sell according to certain predetermined terms and conditions. For example, the owner may specify the sale price, referred to as a limit price, and the order then being referred to as a "limit" order. The owner may also specify other terms, such as "all or none", "fill or kill" and/or the contra-parties that the owner is willing to sell to. The buyer is able to give corresponding instructions to his or her broker.

Conventional centralized order matching systems are well suited for this type of order matching. Indeed, some large brokerage firms have sufficient order flow to match buy and sell orders in their own systems, without sending the order to a centralized system. For small orders, as measured by a suitable combination of number of shares and total value in dollars or other currency, the conventional order matching systems are cost-effective and are used to execute a large percentage of orders.

Conventional order matching systems are not used by the brokerage community for the overwhelming majority of medium and large size orders, as the brokerage community insists it can get better prices using human brokers, despite the larger commission costs.

Furthermore, in more challenging cases in the trading process, the owner advises the broker of how many shares the owner might be interested in selling, if the broker can get a "good price". A buyer may indicate interest in a corresponding manner. This is not an order, but rather an expression of interest. Conventional order matching systems are transparent to this type of market pressure. However, human brokers are able to use such information to seek contra-parties, thus providing markets with more depth and liquidity.

It is desirable to provide an automated system in which shares may be traded with the flexibility present when human brokers are involved in the trade.

There are many marketplaces for trading financial instruments. In each of these marketplaces, to trade a new type of security, for example, futures on the outcome of a political election, or shares in the revenue produced by a football team, requires a costly set-up process wherein potential traders are apprised of the existence of the new instrument and its trading rules.

It is desirable to provide an automated system for trading new financial instruments, or for trading existing instruments according to a new procedure, that avoids the costly set-up process.

SUMMARY OF THE INTENTION

In accordance with an aspect of this invention, there is provided a method of setting a price for a security, comprising maintaining an order book including orders to buy or sell specified quantities of the security at respective prices, the lowest sell order price of the booked orders being the book sell price, the highest buy order price of the booked orders being the book buy order price, automatically engaging in a price discovery procedure before responding to a request for a current buy or sell price of the security to produce an automatically discovered price, and providing the automatically discovered price as the current buy or sell price, the automatically discovered price being better than the book buy or sell price.

In some cases, the price discovery procedure includes providing the book buy or sell price to at least one entity registered to participate in the price discovery procedure. The entity automatically provides an improved price relative to the book price based on a predetermined strategy that is determined independently of the strategies for other entities. The temporal duration of the price discovery procedure can be predetermined or based on an amount of activity occurring during the price discovery procedure.

In accordance with a further aspect of this invention, there is provided a method of providing a published price for a security. A set of entities is notified of a proposed price for buying or selling a pending number of shares of a security. The method automatically determines whether any of the entities has offered an improved price, and provides the improved price as the published price.

In some cases, when there is no improved price, the proposed price is provided as the published price. A decision is made to offer a proposed price when a current book price is different than a most recent trade price.

In accordance with another aspect of this invention, there is provided a method of participating in pricing of a security, comprising receiving a proposed price for a pending number of shares of the security, automatically determining whether to improve upon the proposed price, and when the determination is affirmative, offering an improved price.

It is not intended that the invention be summarized here in its entirety. Rather, further features, aspects and advantages of the invention are set forth in or are apparent from the following description and drawings.

BRIEF DESCRIPTION OF THE DRAWINGS

FIG. 4 is a diagram showing how FIGS. 4A and 4B are to be read together; and FIGS. 4A and 4B are a chart illustrating an example of operation of ELF programs and an umpire program.

DETAILED DESCRIPTION OF THE PREFERRED EMBODIMENTS

A centralized order processing system includes two types of software programs that interact in real-time: ELF programs and umpire programs. An extended liquidity finder (ELF) program is created by a broker to represent his or her orders. An umpire program is created by a party to provide a service to ELF programs. For example, a trading umpire program may provide an electronic exchange to supervise interaction between ELF programs; a pricing umpire program may, in response to a request from an ELF program, provide a price for a security according to a proprietary pricing strategy; a regulatory umpire program may provide surveillance functions to an electronic marketplace, such as authorizing an order match for conversion into a trade; and so on.

Because each order is represented by a program, rather than merely by specified terms and conditions, substantial additional flexibility is provided relative to conventional order processing systems. The ELF program includes code for providing defined behavior and/or the ability to communicate with the broker that is represented by the ELF program. The strategy followed by an ELF program may be maintained fully or partially confidential, or fully or partially public, as determined by the broker that programs the ELF program.

Because the structure of the present system is available to each new umpire program, the set-up process for trading new financial instruments, or for trading existing instruments according to a new procedure, costs less than in conventional marketplaces.

An embodiment of the present trading system will now be described with reference to FIGS. 1-3, and an exemplary operation of this embodiment will be described with reference to FIG. 4.

Figure 1:
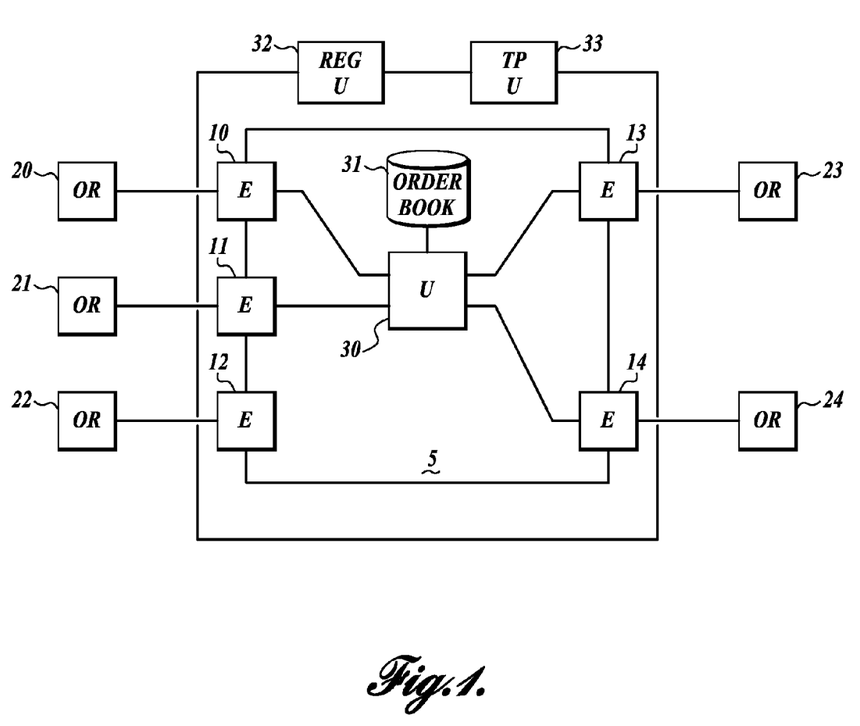
FIG. 1 is a block diagram illustrating ELF programs and an umpire program.

FIG. 1 shows centralized trading system 5 in communication with computers 20-24 in the order rooms of respective brokers. Each of computers 20-24 is associated with a respective ELF program 10-14 via a communication channel such as a dedicated telephone line, a dial-up telephone line, a computer network, a wireless connection or other appropriate channel. Umpire program 30 is a trading umpire and has an associated order book stored in storage 31. Regulatory umpire program 32 and theoretical price umpire program 33 are helper umpire programs for umpire program 30.

Centralized trading system 5 comprises one or more general purpose computers programmed to execute ELF programs 10-14 and umpire programs 30, 32 and 33 and store associated data.

Figure 2:
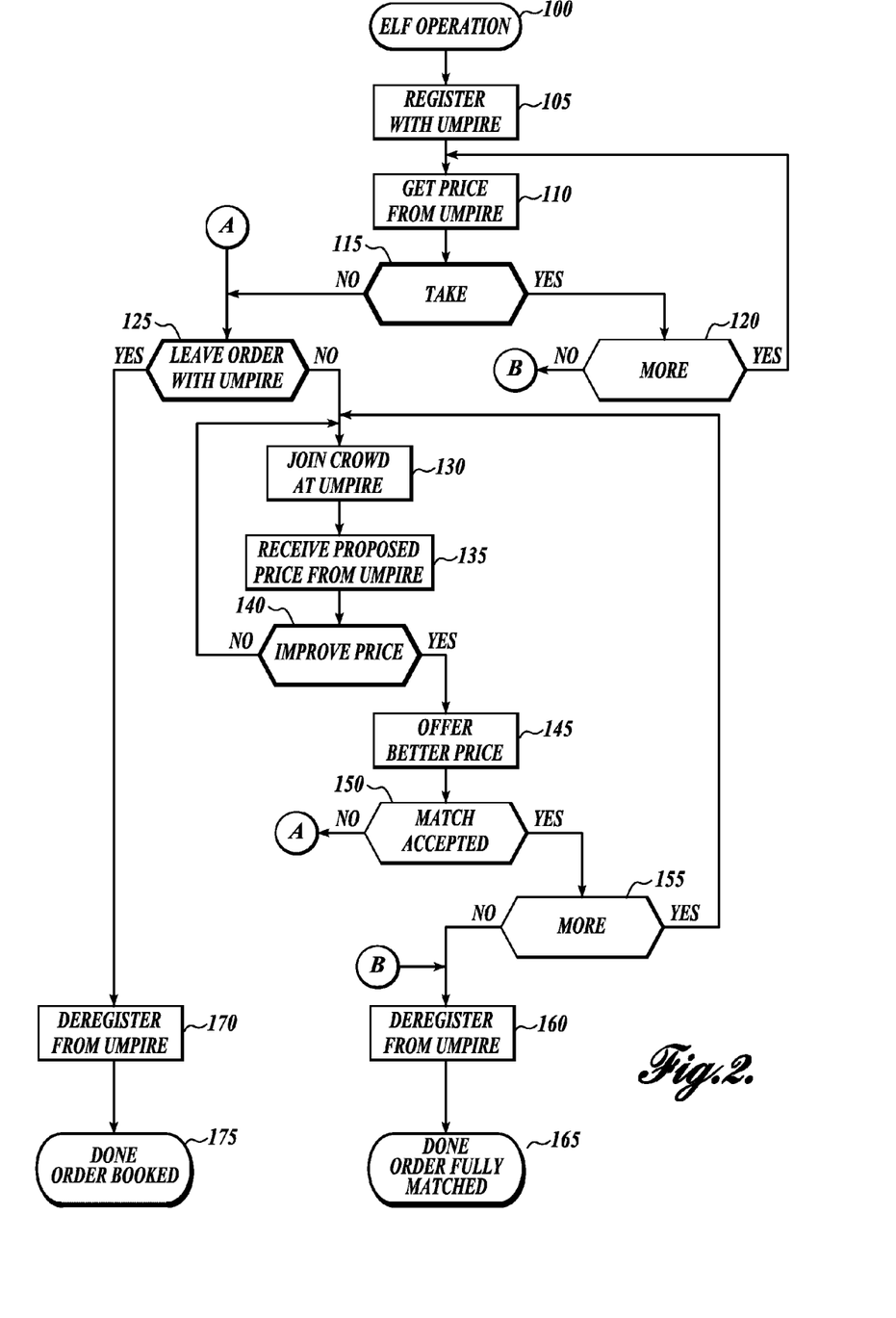
FIG. 2 is a flowchart depicting operation of an ELF program.

FIG. 2 is a flowchart illustrating actions that ELF programs 10-14 perform. In a set-up phase, discussed below, parameters and specific code for ELF programs 10-14 are provided and possibly published by the parties responsible for the ELF programs.

The ELF operation begins at step 100. During operation, at step 105, ELF program 10 registers with umpire program 30 to indicate that ELF program 10 is active. At step 110, ELF program 10 requests a price from umpire program 30. Each umpire program provides a price according to its own published procedures, discussed below.

At step 115, ELF program 10 decides whether it will take the price from umpire program 30 and form a match with an order it is representing. Step 115 is shown with a bold outline, indicating that processing occurs according to a customized strategy defined by the broker that is responsible for ELF program 10. If ELF program 10 wishes to form a match at the quoted price, then at step 120, umpire program 30 takes appropriate action to convert the matched orders into a trade, as discussed below, and if ELF program 10 wishes to find another match, processing returns to step 110, wherein ELF program 10 requests a current price from umpire program 30. If ELF program 10 does not wish to find more matches, then processing proceeds to step 160, wherein ELF program 10 deregisters with umpire program 30, and processing is completed.

If, at step 115, ELF program 10 decided not to form a match at the price from umpire program 30, then processing proceeds to step 125, wherein ELF program 10 decides whether to submit all or part of its order to umpire program 30 for placement in the order book of umpire program 30. Step 125 is shown with a bold outline, indicating that processing occurs according to a customized strategy defined by the broker that is responsible for ELF program 10. If the entire order is left with umpire program 30, then processing proceeds to step 170, wherein ELF program 10 deregisters with umpire program 30. The order is booked and the processing is completed at step 175.

If, at step 125, ELF program 10 decided to continue representing at least part of its order, then at step 130, ELF program 10 "joins the crowd" at umpire program 30, that is, it remains registered at umpire program 30 and available for activity notification from umpire program 30. It will be appreciated that ELF program 10 may be simultaneously registered at multiple umpires, corresponding to representing its order in multiple markets, but this example is concerned with only umpire program 30.

At step 135, an activity notification occurs, specifically, umpire program 30 notifies ELF program 10 that, in response to a price request from another ELF program, umpire program 30 is about to change its price to a new price in accordance with the published price movement strategy of umpire program 30.

At step 140, ELF program 10 decides whether it wishes to improve upon the new price proposed by umpire program 30. Step 140 is shown with a bold outline, indicating that processing occurs according to a customized strategy defined by the broker that is responsible for ELF program 10. If not, then processing returns to step 130 and ELF program 10 continues to be in the crowd for umpire program 30.

If, at step 140, ELF program 10 decided that it should provide an improved price, then at step 145, ELF program 10 offers a better price to umpire program 30. As discussed below, umpire program 30 receives this price, possibly along with other prices from other ELF programs in its crowd, and eventually provides a price to the requesting ELF program.

At step 150, ELF program 10 determines whether the price provided by ELF program 10 has resulted in an order match using the published strategy of umpire program 30. If not, then processing returns to step 125.

If it is determined at step 150 that the improved price from ELF program 10 resulted in an order match, then at step 155, ELF program 10 determines whether it has any more share volume remaining in its original order. If not, then processing proceeds to step 160 where the ELF program 10 deregisters with the umpire program 30, and at step 165, the ELF operation ends with the order fully matched. If so, then processing returns to step 130.

It will be seen that the benefit of putting an order in the book of umpire program 30 is that when the price changes, the booked orders have execution priority. However, the benefit of not putting an order in the book of umpire program 30 is that the existence and size of the order remains secret.

The strategy of an ELF program may depend on one or more of the following factors:
- the size of the crowd at umpire program 30 and/or who is in the crowd, if an ELF program chooses to identify its responsible broker,
- previous prices,
- a theoretical price from theoretical price umpire 33,
- what is in the book, to the extent that an umpire reveals its book, and so on.

Figure 3:
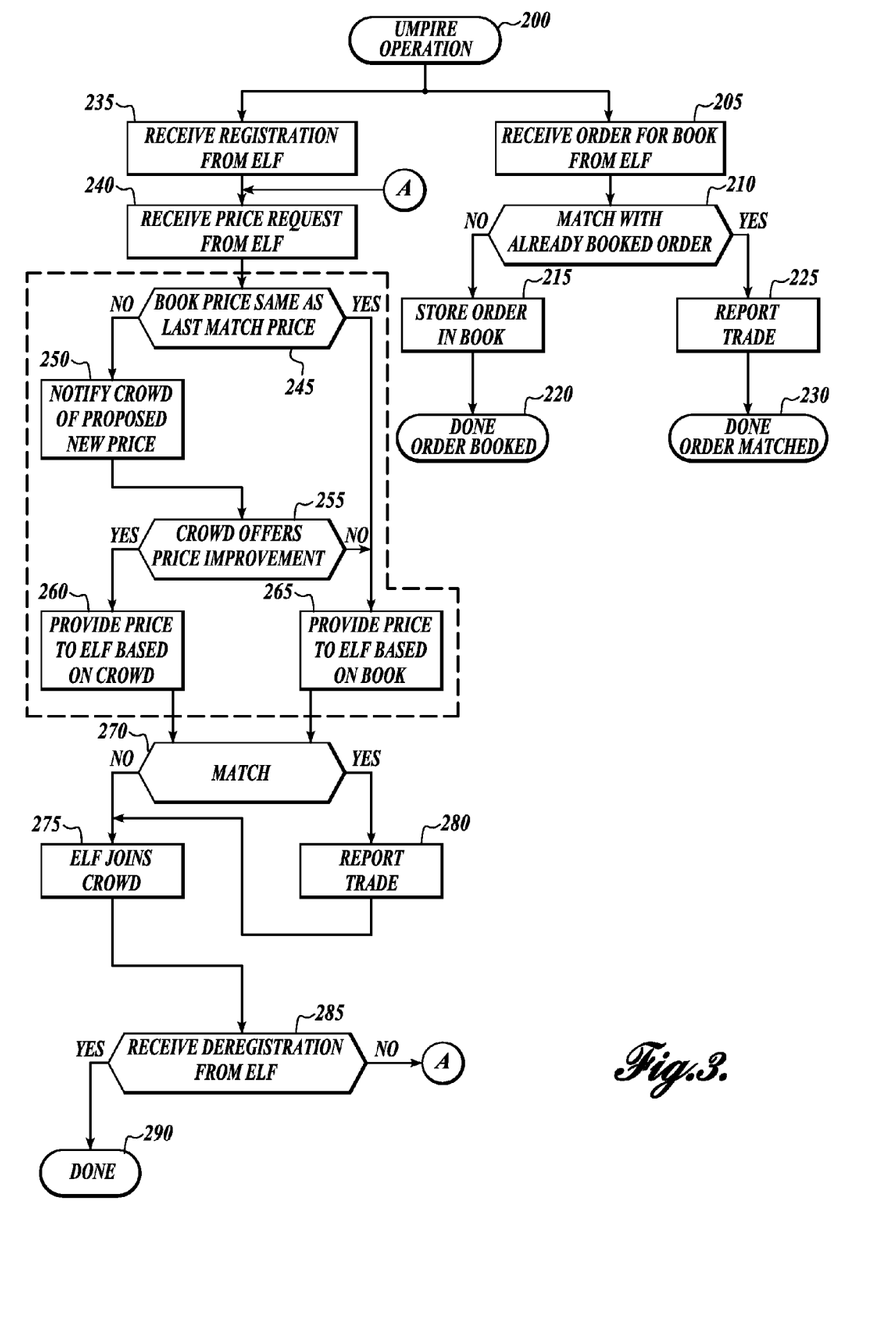
FIG. 3 is a flowchart depicting operation of an umpire program.

FIG. 3 is a flowchart illustrating actions that trading umpire program 30 performs. In a set-up phase, discussed below, parameters and specific code for umpire program 30 are provided and possibly published by the party responsible for the umpire program.

Umpire program 30 simultaneously performs two types of functions: maintaining its order book, and managing the crowd of ELF programs registered therewith. Umpire program 30 may be configured as a multi-threaded program, with one thread for its book processing and a separate thread for each ELF program registered therewith. Other suitable programming structures will be apparent to those of ordinary skill.

Maintaining the order book will now be discussed.

The umpire operation begins at step 200. At step 205, umpire program 30 receives an order for its order book from an ELF program. At step 210, umpire program 30 determines whether this order can be matched with any other orders in the book according to a strategy published by the creator of umpire program 30. If a match cannot be formed, then at step 215, the received order is stored in the order book and ends at step 220 with the order booked. If a match can be formed, then at step 225, umpire program 30 takes appropriate action to report the trade and the order match ends at step 230. Another aspect of book management is removing orders from the book as they are matched with orders from the crowd; this is not shown, and is well understood to those of ordinary skill in the art.

Managing the crowd of registered ELF programs will now be discussed.

At step 235, umpire program 30 receives a registration from ELF program 10. At step 240, ELF program 10 inquires what the current price is. Umpire program 30 responds to a price request according to its published strategy. For this example, the price provision procedure is as shown in steps 245-265, indicated by a dashed line in FIG. 3 and discussed below, but other strategies may be used.

At step 270, umpire program 30 determines whether there is a match, that is, whether ELF program 10 has taken at least one price provided by umpire program 30. If there is no match, that is, ELF program 10 has not taken the offered price, then processing proceeds to step 275, wherein ELF program "joins the crowd" at umpire program 30, that is, it remains registered at umpire program 30 and available for activity notification from umpire program 30. Umpire program 30 keeps ELF program 10 in its crowd until, at step 285, umpire program 30 receives a deregistration notice from ELF program 10, at which point processing for ELF program 10 is completed at step 290. It will be appreciated that, at any time while ELF program 10 is in the crowd for umpire program 30, ELF program 10 may book an order with umpire program 30. A booked order may be all or part of the order represented by ELF program 10.

If at step 270, umpire program 30 determines that a match has been formed, then at step 280, umpire program 30 takes appropriate action to report the trade, and processing proceeds to step 275.

The price provision procedure for umpire program 30 will now be discussed.

During set-up of umpire program 30, its price provision procedure is selected and published by the creator of umpire program 30. During set-up of the ELF programs, the price provision strategy of the umpires they interact with is obtained. Accordingly, an ELF program asking an umpire program for a price understands the nature of the information being provided by the umpire program, and ELF programs in the crowd of an umpire program can properly participate in price setting.

At step 245, umpire program 30 has received the price request that ELF program 10 issued at step 240. Umpire program 30 first determines whether the available price based on its booked orders is the same as the price at which the most recent match occurred. If so, then at step 265, umpire program 30 provides a price to ELF program 10 based on its book. In some embodiments, umpire program 30 may provide a list of all or part of the booked orders, or a summary showing booked share volume at each price or at prices near the available price.

However, if at step 245, umpire program 30 determines that the available price based on its booked orders is the different than the price at which the most recent match occurred, then at step 250, umpire program 30 notifies its crowd of ELF programs of what its proposed new price will be. At step 255, umpire program 30 determines whether any of the ELF programs in its crowd are willing to provide a better price. In some cases, multiple ELF programs may be willing to provide a better price, and so umpire program 30 selects one of the ELF programs based on its published price provision strategy. If none of the ELF programs in its crowd are willing to provide a better price, then processing proceeds to step 265, and the proposed price based on the booked orders is provided.

However, if at step 255, umpire program 30 determines that a better price is available from its crowd of ELF programs, then at step 260, umpire program 30 provides the price from the ELF program in the crowd to ELF program 10.

It will be appreciated that different ELF programs can readily use different strategies to provide price improvement to expeditiously execute their own orders. The ELF programs can make more informed decisions than brokers in a crowd, because the ELF programs can be in real-time communication with many data sources, both present in the marketplace of trading system 5 and external to trading system 5. Alternatively, an ELF program may merely present its universe of information to a remote trader; the remote trader can be electronically "present" in many markets simultaneously.

An example of a set-up phase for ELF programs 10 and 13, and umpire program 30 will now be provided. It will be appreciated that a wide variety of strategies may be used. When a broker wishes to try several markets for the same order, the broker is responsible for ensuring co-ordination of ELF programs to avoid multiple executions of the same order.

During a set-up phase, the owners of the ELF and umpire programs decide
the program's strategy,
how much of the strategy will be public
for an ELF program, the umpire program(s) it may register at, and who is (or is not) an acceptable trading partner, and
for an umpire program, the ELF programs that are (or are not) acceptable.

As shown in FIG. 1, ELF programs 10, 11, 13 and 14 are approved for registration at umpire program 30, but ELF program 12 is not allowed to register at umpire program 30. Let it be assumed that all ELF programs are willing to trade with each other.

In this example, umpire program 30 is a book umpire, meaning it maintains a file (book) of orders left by ELF programs for execution by the umpire program. It will be appreciated that a special ELF program may be used to represent an external market to increase the market depth. The price provision strategy of umpire program 30 is to give all registered ELF programs a copy of the book when they register; and in response to a request, to provide a firm price quote within one second. Partial matches at the quote are allowed. More specifically, if the book price is the same as the last match price, then umpire program 30 provides the book price as its quote. However, if the best book price is different than the last match price, then umpire program 30 notifies its crowd that it is about to offer a changed price, and will take the first improved price provided within one second. Additionally, umpire program 30 does not allow an ELF program to "walk the book", instead, umpire program 30 requires clean-up pricing, described in detail below.

In this example, ELF program 10 is assumed to represent an order to BUY 100,000 shares of the security being traded at umpire program 30.
ELF program 10 will not take the first price offered by umpire program 30; this is an "I can get you a better price" strategy.
ELF program 10 will initially book 5,000 shares at two whole points below the quote, and will book when less than 10,000 of its shares are unmatched at a price of 0.5 points below its last execution.
The price improvement strategy of ELF program 10 is: (i) when the umpire's proposed price is at least 0.3 different than the last execution price, offer a price that is 0.1 better than the proposed price; or, (ii) if ELF program 10 offered an improved price in the last match, and can offer that price again as an improvement, then do so.

In this example, ELF program 13 is assumed to represent an order to SELL 50,000 shares of the security being traded at umpire program 30.
ELF program 13 will take the first price offered by umpire program 30, and until its order is matched, will take the next two prices offered by umpire program 30, then pause and wait for new instructions from computer 23; this is a "hurry and sell" strategy.
ELF program 13 will never book any of its shares.
The price improvement strategy of ELF program 13 is: do not improve the price.

Figures 4, 4A:
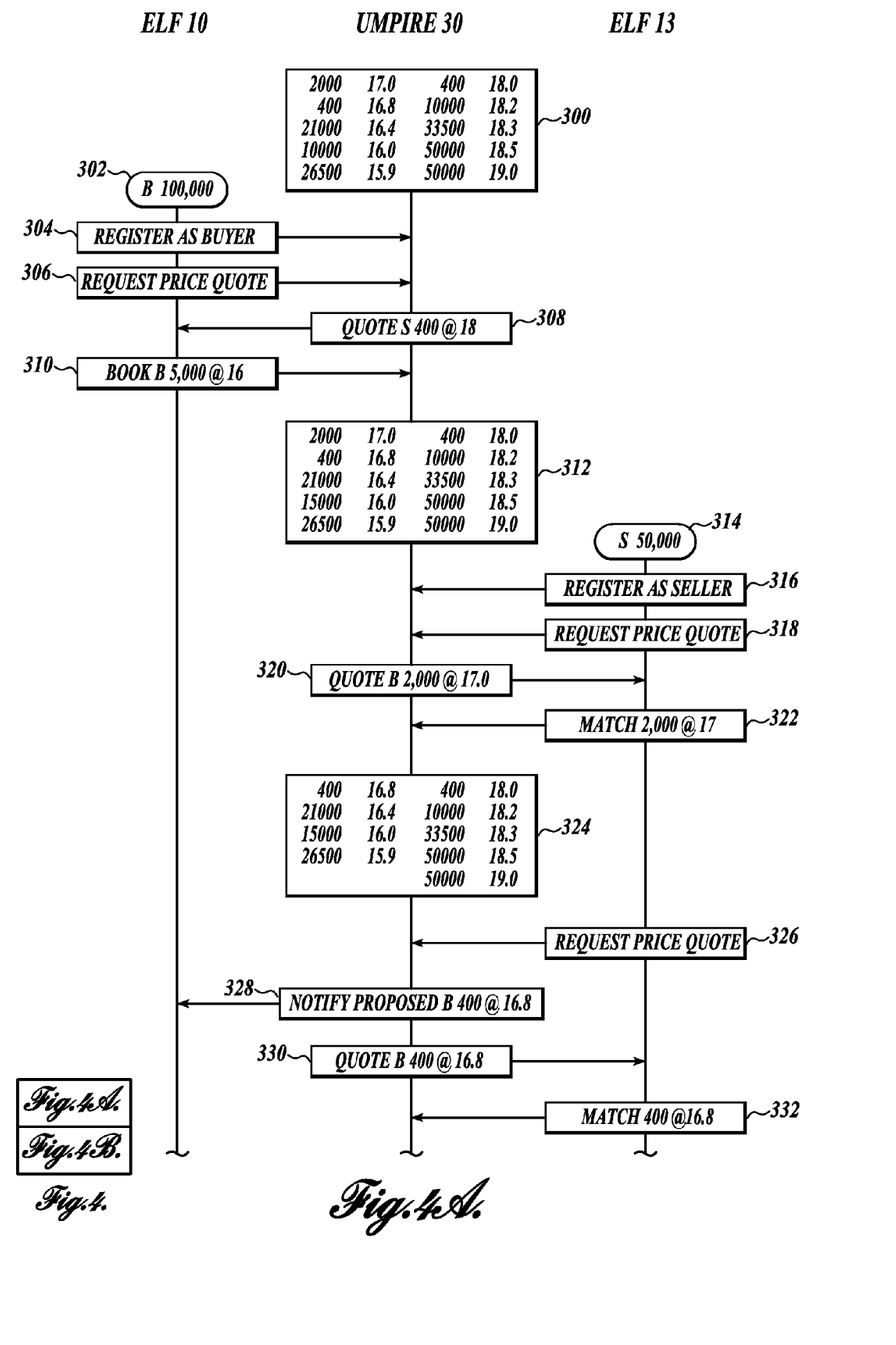
Figure 4B:
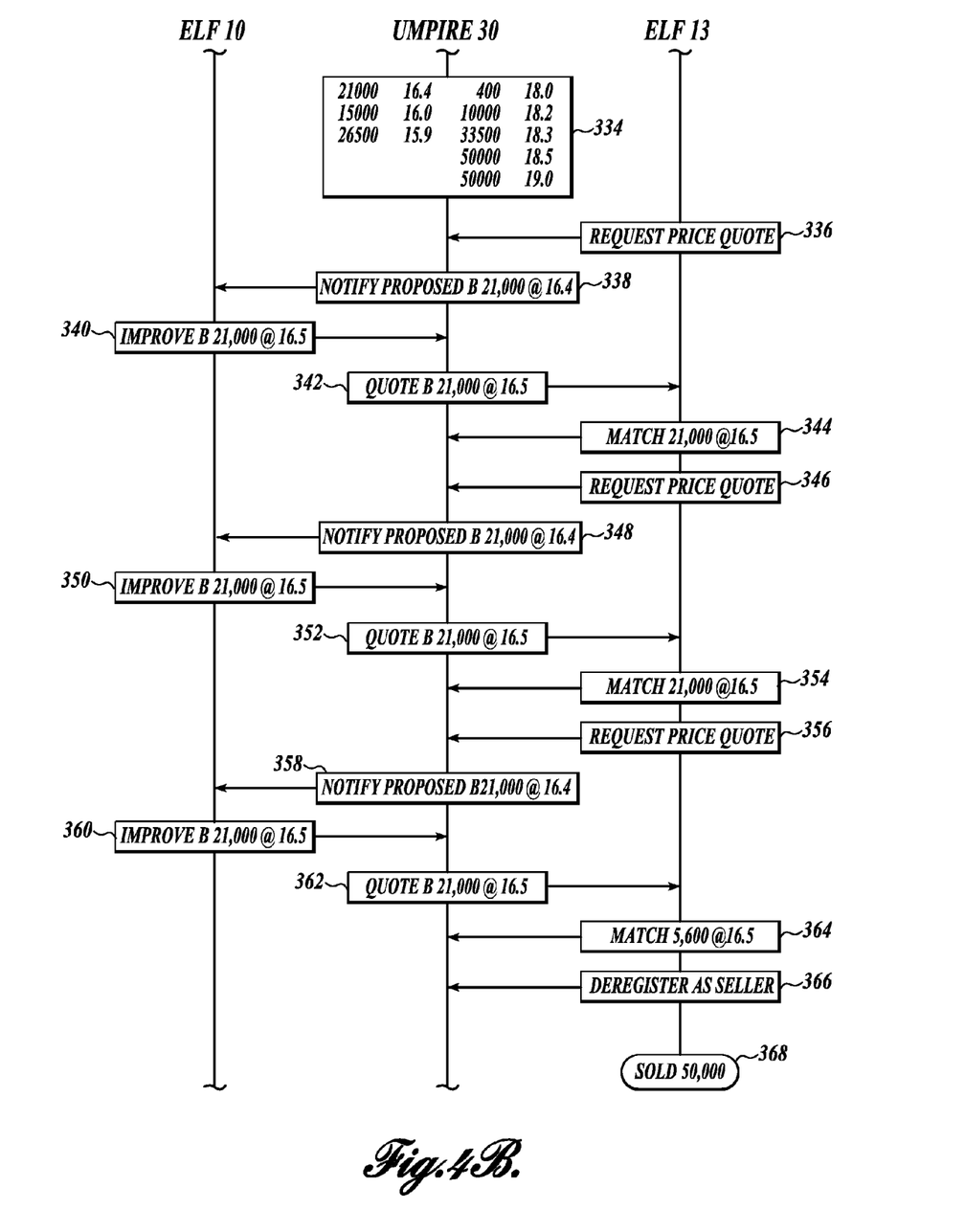

FIG. 4 is a diagram depicting how FIGS. 4A and 4B are to be read together. FIGS. 4A and 4B are henceforth referred to as FIG. 4.

At time 300, the book is as shown in FIG. 4. Let it be assumed that the previous match was a match at a price of 17.

At time 302, ELF program 10 establishes communication with umpire program 30. At time 304, ELF program 10 registers with umpire program 30 as a buyer. At time 306, ELF program 10 requests a price quote. Umpire program 30 determines that its last match price (17) is different than the sell price of the book (18), then determines that no one else is in the crowd, so at time 308, umpire program 30 provides the book price as its quote:
sell 400@18
At time 310, ELF program 10 declines the price quote according to its strategy, and books 5000 shares at two points below the quote, that is, at a price of 16. Accordingly, at time 312, the book is as shown, specifically, the order volume at 16 has increased by 5000 shares.

The steps of the flowcharts of FIGS. 2 and 3 executed during the above-described actions are shown in Table 1.

TABLE 1

|  | ELF 10 | umpire 30 | ELF 13 |
| --- | --- | --- | --- |
| time 304 | step 105 | step 235 |  |
| time 306 | step 110 | step 240 |  |
| time 308 | step 110 | step 265 |  |
| time 310 | step 125 | step 205 |  |
| time 312 | step 130 | step 215 |  |

At time 314, ELF program 13 establishes communication with umpire program 30. At time 316, ELF program 13 registers with umpire program 30 as a seller. At time 318, ELF program 13 requests a price quote. Umpire program 30 determines that its last match price (17) is the same as the buy price of the book, so at time 320, umpire program 30 provides the book price as its quote:
buy 2000@17
Following its strategy, at time 322, ELF program 13 takes this price, thereby forming a match. Accordingly, at time 324, the book is as shown, specifically, the order volume at 17 is gone.

The steps of the flowcharts of FIGS. 2 and 3 executed during the above-described actions are shown in Table 2.

TABLE 2

|  | ELF 10 | umpire 30 | ELF 13 |
| --- | --- | --- | --- |
| time 316 |  | step 235 | step 105 |
| time 318 |  | step 240 | step 110 |
| time 320 |  | step 265 | step 110 |
| time 322 |  | step 280 | step 115 |

At time 326, ELF program 13 requests a price quote. Umpire program 30 determines that its last match price (17) is different than the new buy price of the book (16.8), and at time 328, notifies the crowd, that is, ELF program 10, of its proposed new price. Following its strategy of being silent when the proposed price is less than 0.3 points different than the previous price, ELF program 10 does not offer its own price. So at time 330, umpire program 30 provides the book price as its quote:
buy 400@16.8
Following its strategy, at time 332, ELF program 13 takes this price, thereby forming a match. Accordingly, at time 334, the book is as shown, specifically, the order volume at 16.8 is gone.

The steps of the flowcharts of FIGS. 2 and 3 executed during the above-described actions are shown in Table 3.

TABLE 3

|  | ELF 10 | umpire 30 | ELF 13 |
|---|---|---|---|
| time 326 |  | step 240 | step 110 |
| time 328 | step 135 | step 250 | step 110 |
| time 330 |  | step 265 | step 110 |
| time 332 |  | step 280 | step 115 |

At time 336, ELF program 13 requests a price quote. Umpire program 30 determines that its last match price (16.8) is different than the new buy price of the book (16.4), and at time 338, notifies the crowd, that is, ELF program 10, of its proposed new price and volume. Following its strategy of improving the price when the proposed price is at least 0.3 points different than the previous price, at time 340, ELF program 10 offers its own price of 16.5. So at time 342, umpire program 30 provides the price from ELF program 10 as its quote:

buy 21,000@16.5

Following its strategy, at time 344, ELF program 13 takes this price, thereby forming a match.

The steps of the flowcharts of FIGS. 2 and 3 executed during the above-described actions are shown in Table 4.

TABLE 4

|  | ELF 10 | umpire 30 | ELF 13 |
|---|---|---|---|
| time 336 |  | step 240 | step 110 |
| time 338 | step 135 | step 250 | step 110 |
| time 340 | step 140 | step 255 | step 110 |
| time 342 |  | step 260 | step 110 |
| time 344 |  | step 280 | step 115 |

At time 346, ELF program 13 requests a price quote. Umpire program 30 determines that its last match price (16.5) is different than the new buy price of the book (16.4), and at time 338, notifies the crowd, that is, ELF program 10, of its proposed new price and volume. Following its strategy of improving the proposed price at its last match price, at time 350, ELF program 10 offers its own price of 16.5. So at time 352, umpire program 30 provides the price from ELF program 10 as its quote:

buy 21,000@16.5

Following its strategy, at time 354, ELF program 13 takes this price, thereby forming a match.

The steps of the flowcharts of FIGS. 2 and 3 executed during the above-described actions are shown in Table 5.

TABLE 5

|  | ELF 10 | umpire 30 | ELF 13 |
|---|---|---|---|
| time 346 |  | step 240 | step 110 |
| time 348 | step 135 | step 250 | step 110 |
| time 350 | step 140 | step 255 | step 110 |
| time 352 |  | step 260 | step 110 |
| time 354 |  | step 280 | step 115 |

At time 356, ELF program 13 requests a price quote. Umpire program 30 determines that its last match price (16.5) is different than the new buy price of the book (16.4), and at time 358, notifies the crowd, that is, ELF program 10, of its proposed new price and volume. Following its strategy of improving the proposed price at its last match price, at time 360, ELF program 10 offers its own price of 16.5. So at time 362, umpire program 30 provides the price from ELF program 10 as its quote:

buy 21,000@16.5

Following its strategy, at time 364 ELF program 13 takes this price for its remaining 5,600 shares, thereby forming a match. ELF program 13 has now sold all of the shares in its order, so at time 366, ELF program 13 deregisters as a seller in the crowd for umpire program 30 and completes its operation at time 368.

The steps of the flowcharts of FIGS. 2 and 3 executed during the above-described actions are shown in Table 6.

TABLE 6

|  | ELF 10 | umpire 30 | ELF 13 |
|---|---|---|---|
| time 356 |  | step 240 | step 110 |
| time 358 | step 135 | step 250 | step 110 |
| time 360 | step 140 | step 255 | step 110 |
| time 362 |  | step 260 | step 110 |
| time 364 |  | step 280 | step 115 |
| time 366 |  | step 285 | step 160 |

As illustrated by the price improvement strategy of ELF program 10, an ELF program's strategy can be a series of rules or conditions that collectively operate in pachinko fashion (a Japanese game wherein a ball is rolled down a board until it finds a hole of the proper size to go into).

The price improvement achieved in the example of FIG. 4 will now be quantified.

When ELF program 10 arrived at umpire program 30, the book was as shown at time To match its BUY 100,000 share order, ELF Program 10 would have taken shares at prices from 18 through 19. Taking each of the booked orders at its limit price ("walking the book") causes a price disadvantage for the sell orders at the best price (18) relative to the orders at the clean-up (furthest from market) price (19), which is contrary to the priority an order should get for being exposed to the public in the book. Accordingly, as published during set-up, umpire program 30 requires clean-up pricing, meaning that ELF program 10 would have to take the clean-up price for all of its shares, to prevent disadvantage to the order booked at the best price. Thus, the book price for ELF program 10's entire order would have been 19. As seen from the example in FIG. 4, ELF program 10 has so far bought 47,000 shares at 16.5, which is a dramatically better price than 19.

When ELF program 13 arrived at umpire program 30, the book was as shown at time To match its SELL 50,000 share order, ELF program 13 would have taken shares at prices from 17 through 15.9. Since umpire program 30 requires clean-up pricing, the book price for ELF program 13's entire order would have been 15.9. As can be seen from the example in FIG. 4, ELF program 13 sold at an average price of:

$$\frac{(2,000)(17) + (400)(16.8) + (47,600)(16.5)}{50,000} = 16.5224$$

As can be seen, ELF program 13 obtained an improved price of 16.5224 relative to the book price of 15.9.

Although an illustrative embodiment of the present invention, and various modifications thereof, have been described in detail herein with reference to the accompanying drawings, it is to be understood that the invention is not limited to this precise embodiment and the described modifications, and that various changes and further modifications may be effected therein by one skilled in the art without departing from the scope or spirit of the invention as defined in the appended claims.

What is claimed is:

1. A computer-implemented method of pricing a security, comprising:
under control of instructions that are executed by one or more computer processors of a computing system:
registering a first computer program for trading activity in the security,
receiving a price inquiry for the security from a second computer program that is executing separate from the first computer program,
as a result of registering the first computer program, providing the first computer program with a price improvement opportunity based on the price inquiry received from the second computer program,
wherein said providing the first computer program with a price improvement opportunity includes providing a proposed buy or sell price for the security to the first computer program and determining if the first computer program is willing to provide an improved price,
wherein the improved price is a price that is higher than the proposed buy price or lower than the proposed sell price and is a price at which the first computer program is willing to trade for the security, and
wherein the improved price is not entered into an order book that includes publicly disclosed buy or sell orders for the security, and
in response to the price inquiry received from the second computer program:
if an improved price is received from the first computer program, then providing the improved price to the second computer program, and
if an improved price is not received from the first computer program, then providing the proposed buy or sell price to the second computer program.

2. The method of claim 1, further comprising maintaining the registration of the first computer program until a deregistration notice is received from the first computer program.

3. The method of claim 1, further comprising maintaining the order book that includes buy or sell orders for the security, the order book having a book sell price being the lowest sell price for sell orders or a book buy price being the highest buy price for buy orders,
wherein said providing a price improvement opportunity to the first computer program is conditioned on whether the book buy or sell price matches the price for which the security was respectively last bought or sold.

4. The method of claim 3, wherein if the book buy or sell price is different than the price at which the security was respectively last bought or sold, then providing the price improvement opportunity to the first computer program in which the proposed buy or sell price is the book buy or sell price and the improved price received from the first computer program is a price that is higher than the book buy price or lower than the book sell price.

5. The method of claim 1, further comprising:
receiving from the second computer program a buy or sell order for the security at the improved price.

6. The method of claim 1, further comprising:
registering the second computer program for trading activity in the security,
receiving a price inquiry for the security from the first computer program,
as a result of registering the second computer program, providing the second computer program with a price improvement opportunity based on the price inquiry received from the first computer program,
wherein said providing the second computer program with a price improvement opportunity includes providing a proposed buy or sell price for the security to the second computer program and determining if the second computer program is willing to provide an improved price,
wherein the improved price is a price that is higher than the proposed buy price or lower than the proposed sell price and is a price at which the second computer program is willing to trade for the security, and
wherein the improved price is not entered into the order book that includes publicly disclosed buy or sell orders for the security, and
in response to the price inquiry received from the first computer program:
if an improved price is received from the second computer program, then providing the improved price to the first computer program, and
if an improved price is not received from the second computer program, then providing the proposed buy or sell price to the first computer program.

7. A computing system configured for pricing a security, comprising:
a registration component executing on at least one computer processor, wherein the registration component is configured to register a first computer program for trading activity in the security, and
a communication component executing on at least one computer processor, wherein the communication component is configured to receive a price inquiry for the security from a second computer program that is executing separate from the first computer program, and as a result of registration of the first computer program, provide the first computer program with a price improvement opportunity based on the price inquiry received from the second computer program,
wherein providing the price improvement opportunity includes providing a proposed buy or sell price for the security to the first computer program and determining if the first computer program is willing to provide an improved price,
wherein the improved price is a price that is higher than the proposed buy price or lower than the proposed sell price and is a price at which the first computer program is willing to trade for the security, and
wherein the improved price is not entered into an order book that includes publicly disclosed buy or sell orders for the security, and
in response to the price inquiry received from the second computer program, the communication component is further configured to:
provide the improved price to the second computer program if an improved price is received from the first computer program, and
if an improved price is not received from the first computer program, then provide the proposed buy or sell price to the second computer program.

8. The system of claim 7, wherein the registration of the first computer program is maintained until a deregistration notice is received from the first computer program.

9. The system of claim 7, further comprising an order book component executing on at least one computer process, wherein the order book component is configured to maintain the order book that includes buy or sell orders for the security, the order book having a book sell price being the lowest sell price for sell orders or a book buy price being the highest buy price for buy orders,
    wherein said providing a price improvement opportunity to the first computer program is conditioned on whether the book buy or sell price matches the price at which the security was respectively last bought or sold.

10. The system of claim 9, wherein if the book buy or sell price is different than the price at which the security was respectively last bought or sold, the communication component is further configured to provide the price improvement opportunity in which the proposed buy or sell price is the book buy or sell price and the improved price received from the first computer program is a price that is higher than the book buy price or lower than the book sell price.

11. The system of claim 7, wherein the communication component is further configured to receive from the second computer program a buy or sell order for the security at the improved price.

12. The system of claim 7, wherein the registration component is further configured to register the second computer program for trading activity in the security, and
    wherein the communication component is further configured to:
        receive a price inquiry for the security from the first computer program,
        as a result of registration of the second computer program, provide the second computer program with a price improvement opportunity based on the price inquiry received from the first computer program,
            wherein providing the price improvement opportunity includes providing a proposed buy or sell price for the security to the second computer program and determining if the second computer program is willing to provide an improved price,
            wherein the improved price is a price that is higher than the proposed buy price or lower than the proposed sell price and is a price at which the second computer program is willing to trade for the security, and
            wherein the improved price is not entered into the order book that includes publicly disclosed buy or sell orders for the security, and
        in response to the price inquiry received from the first computer program:
            provide the improved price to the first computer program if an improved price is received from the second computer program, and
            if an improved price is not received from the second computer program, then provide the proposed buy or sell price to the first computer program.

13. A computer-accessible storage medium having executable instructions stored thereon for pricing a security, wherein in response to execution, the instructions cause the computer to:
    register a first computer program for trading activity in the security,
    receive a price inquiry for the security from a second computer program that is executing separate from the first computer program,
    provide the first computer program with a price improvement opportunity as a benefit of being registered for trading activity in the security,
        wherein providing the price improvement opportunity is triggered by receipt of the price inquiry and includes providing a proposed buy or sell price for the security to the first computer program and determining if the first computer program is willing to submit an improved price in reply, and
        wherein the improved price is a price that is higher than the proposed buy price or lower than the proposed sell price and is a price at which the first computer program is willing to trade for the security, and
    in response to the price inquiry received from the second computer program:
        provide the improved price to the second computer program if an improved price is received from the first computer program, wherein the improved price is provided only to the second computer program, and
        if an improved price is not received from the first computer program, then provide the proposed buy or sell price to the second computer program.

14. The computer-accessible storage medium of claim 13, wherein, in response to execution, the instructions further cause the computer to maintain the registration of the first computer program until a deregistration notice is received from the first computer program.

15. The computer-accessible storage medium of claim 13, wherein, in response to execution, the instructions further cause the computer to maintain an order book that includes buy or sell orders for the security, the order book having a book sell price that is the lowest sell price for sell orders or a book buy price being the highest buy price for buy orders, and
    wherein providing the price improvement opportunity to the first computer program is conditioned on whether the book buy or sell price matches the price at which the security was respectively last bought or sold.

16. The computer-accessible storage medium of claim 15, wherein if the book buy or sell price is different than the price at which the security was respectively last bought or sold, the instructions further cause the computer to provide the price improvement opportunity to the first computer program in which the proposed buy or sell price is the book buy or sell price, and
    wherein the improved price received from the first computer program is a price that is higher than the book buy price or lower than the book sell price.

17. The computer-accessible storage medium of claim 13, wherein, in response to execution, the instructions further cause the computer to receive from the second computer program a buy or sell order for the security at the improved price.

18. The computer-accessible storage medium of claim 13, wherein, in response to execution, the instructions further cause the computer to:
    register the second computer program for trading activity in the security,
    receive a price inquiry for the security from the first computer program,
    provide the second computer program with a price improvement opportunity as a benefit of being registered for trading activity in the security,
        wherein providing the price improvement opportunity to the second computer program is triggered by receipt of the price inquiry from the first computer program,
        wherein providing the price improvement opportunity includes providing a proposed buy or sell price for the security to the second computer program and determining if the second computer program is willing to submit an improved price in reply, and
        wherein the improved price is a price that is higher than the proposed buy price or lower than the proposed sell price and is a price at which the second computer program is willing to trade for the security, and in response to the price inquiry received from the first computer program:

provide the improved price to the first computer program if an improved price is received from the second computer program, wherein the improved price is provided only to the first computer program, and if an improved price is not received from the second computer program, then provide the proposed buy or sell price to the first computer program.

19. A computing system configured for pricing a security, comprising:

means for registering a first computer program for trading activity in the security, means for receiving a price inquiry for the security from a second computer program that is executing separate from the first computer program, means for providing the first computer program with a price improvement opportunity based on the price inquiry received from the second computer program, wherein providing the price improvement opportunity includes providing a proposed buy or sell price for the security to the first computer program and determining if the first computer program is willing to provide an improved price, wherein the improved price is a price that is higher than the proposed buy price or lower than the proposed sell price and is a price at which the first computer program is willing to trade for the security, and wherein the improved price is not entered into an order book that includes publicly disclosed buy or sell orders for the security, and in response to the price inquiry received from the second computer program:

means for providing the improved price to the second computer program if an improved price is received from the first computer program, and means for providing the proposed buy or sell price to the second computer program if an improved price is not received from the first computer program.

20. The system of claim 19, further comprising means for maintaining the order book that includes buy or sell orders for the security, the order book having a book sell price being the lowest sell price for sell orders or a book buy price being the highest buy price for buy orders, wherein said means for providing a price improvement opportunity to the first computer program conditions providing the price improvement opportunity on whether the book buy or sell price matches the price at which the security was respectively last bought or sold, and if the book buy or sell price is different than the price at which the security was respectively last bought or sold, then providing the price improvement opportunity to the first computer program in which the proposed buy or sell price is the book buy or sell price, wherein the improved price received from the first computer program is a price that is higher than the book buy price or lower than the book sell price.

* * * * *

UNITED STATES PATENT AND TRADEMARK OFFICE
CERTIFICATE OF CORRECTION

PATENT NO.        : 8,380,609 B2
APPLICATION NO.   : 11/469378
DATED             : February 19, 2013
INVENTOR(S)       : Keith It is certified that error appears in the above-identified patent and that said Letters Patent is hereby corrected as shown below:

On the Title Page, Item (56), under "OTHER PUBLICATIONS", in Column 2, Line 3, delete "year-end.;" and insert -- year-end; --, therefor.

On Title Page 2, Item (56), under "OTHER PUBLICATIONS", in Column 2, Line 23, delete ""MiFI D" and insert -- "MiFID --, therefor.

On Title Page 2, Item (56), under "OTHER PUBLICATIONS", in Column 2, Line 34, delete "<http://proquest.umi.com/pqweb?index=" and insert -- <http://proquest.umi.com/pqdweb?index= --, therefor.

On Title Page 3, Item (56), under "OTHER PUBLICATIONS", in Column 1, Line 54, delete "[retreived" and insert -- [retrieved --, therefor.

On Title Page 3, Item (56), under "OTHER PUBLICATIONS", in Column 2, Line 37, delete "Business2.com,," and insert -- Business2.com, --, therefor.

On Title Page 3, Item (56), under "OTHER PUBLICATIONS", in Column 2, Line 38, delete "pp. 90 91." and insert -- pp. 90-91. --, therefor.

In the Specifications

In Column 2, Line 26, delete "INTENTION" and insert -- INVENTION --, therefor.

In Column 6, Line 3, delete "program" and insert -- program 10 --, therefor.

In Column 10, Line 32, delete "time" and insert -- time 300. --, therefor.

In Column 10, Line 48, delete "time" and insert -- time 312. --, therefor.

Signed and Sealed this
Thirteenth Day of May, 2014

Michelle K. Lee
*Deputy Director of the United States Patent and Trademark Office*